Sept. 19, 1967  E. P. DANIELSON  3,342,441
BUMPER BRACKET
Filed April 4, 1966
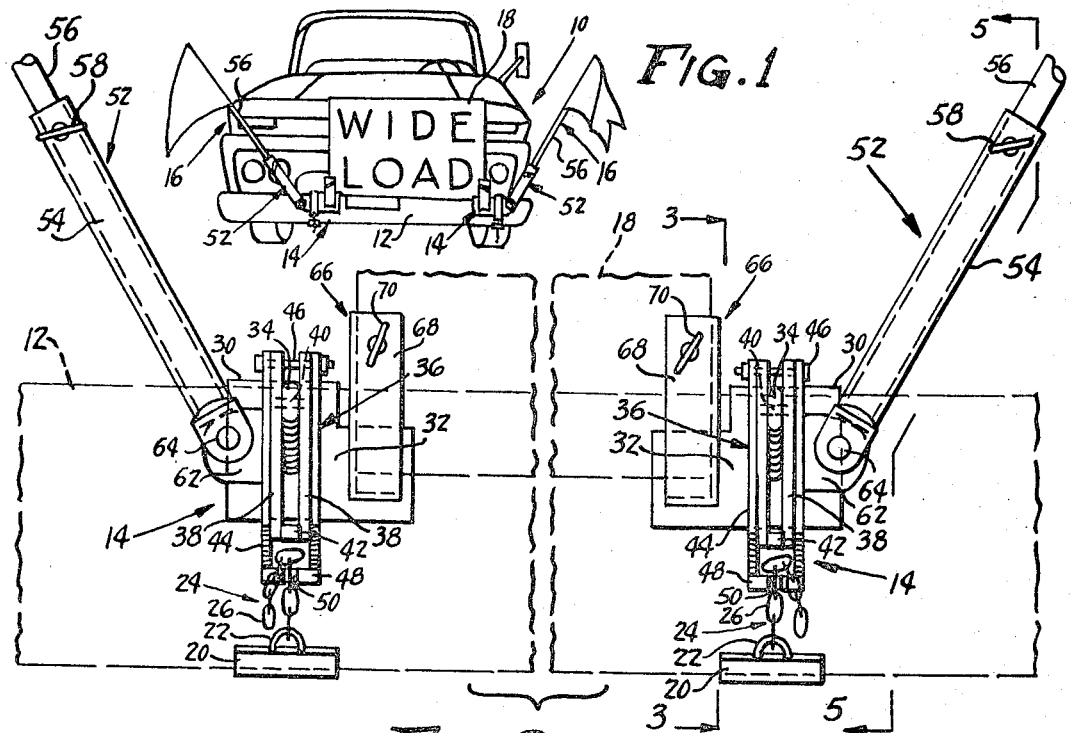
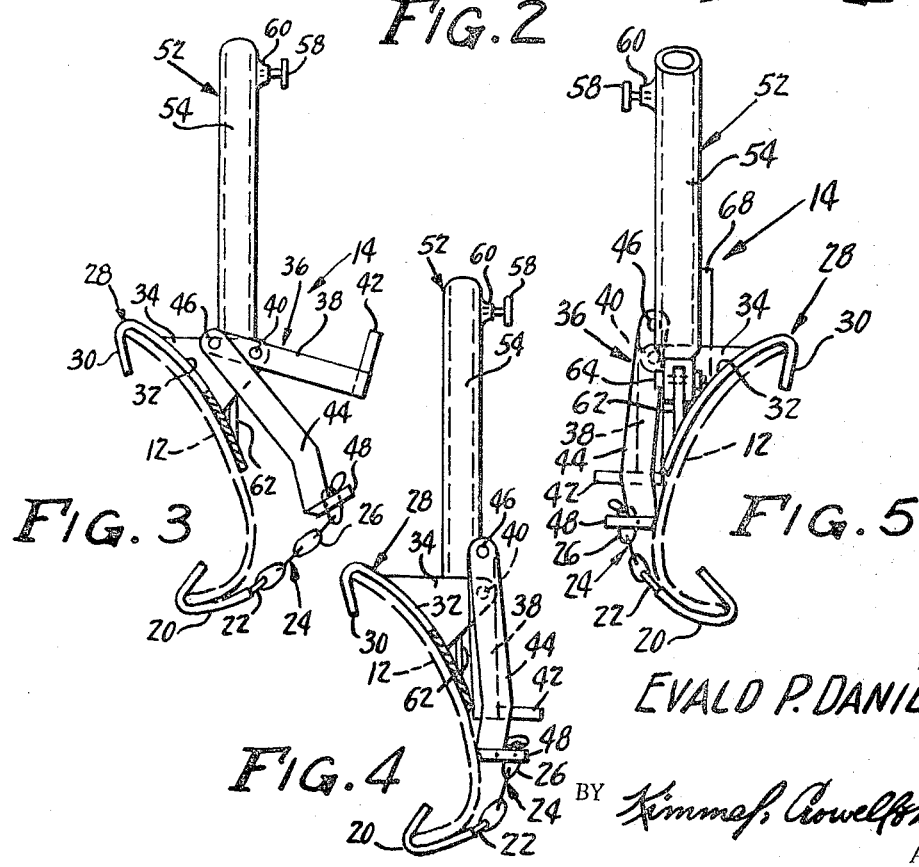
INVENTOR.
EVALD P. DANIELSON
BY Kimmel, Crowell & Weaver
ATTORNEYS.

United States Patent Office 3,342,441
Patented Sept. 19, 1967

3,342,441
BUMPER BRACKET
Evald P. Danielson, Rte. 3, Box 868,
Woodland, Calif. 95695
Filed Apr. 4, 1966, Ser. No. 539,895
6 Claims. (Cl. 248—42)

ABSTRACT OF THE DISCLOSURE

A bumper bracket which includes a hook for engaging the top of an automobile bumper, another hook for engaging the bottom of the automobile bumper, a chain secured to the bottom hook, a double lever over-center securing device for tightening the upper and lower hooks on the bumper, a support for a flag and a support for a rectangular sign both secured to the bracket is disclosed.

---

This invention relates to a bumper bracket, and more particularly to a device which may be rapidly attached to a vehicle bumper for carrying an upstanding article, such as a sign, a flag or both.

As conducive to an understanding of the instant invention, it should be noted that the prior art has disclosed various mechanisms for attaching signs and radio antennas to vehicle bumpers. The devices of the prior art contemplate the use of a screw adjustment mechanism for tightening a chain or other flexible member to secure a hook on the upper and lower edges of the bumper. A prime disadvantage in the use of the prior art devices lies in the need of wrenches and the like to place and remove the prior art brackets from a vehicle bumper. In addition, the screw adjustment means of the prior art devices are susceptible to atmospheric corrosion or rust thereby further limiting the effectiveness of the screw adjustment mechanism.

It is an object of the instant invention to provide a bracket for attachment to a vehicle bumper for carrying an upright article in which the bracket is constructed and arranged for rapid and easy placement on the bumper.

Another object of the instant invention is to provide a bumper bracket in which a pair of bumper engaging hooks are interconnected by a boomer for easily drawing a flexible element into a rigid state for affixing the hooks to the bumper.

Still another object of the instant invention is to provide a bumper bracket having means for holding the staff of a flag.

A further object of the instant invention is to provide a pair of spaced apart bumper brackets on a vehicle bumper for holding a sign therebetween.

Other objects and advantages of the instant invention reside in the combinations of elements, arrangements of parts and features of construction and operation, all as will be more fully pointed out hereinafter and disclosed in the accompanying drawing wherein there is shown a preferred embodiment of this inventive concept.

In the drawing:

FIGURE 1 is a front view of a vehicle equipped with a pair of bumper brackets constructed in accordance with the principles of the instant invention holding a pair of flags and a sign;

FIGURE 2 is an enlarged front elevational view of the vehicle bumper and bumper brackets of FIGURE 1, certain parts being broken away for clarity of illustration;

FIGURE 3 is a cross-sectional view of the bumper and bumper bracket of FIGURE 2 taken substantially along line 3—3 as viewed in the direction indicated by the arrows, illustrating the boomer in a position immediately before tightening of the bracket on the bumper;

FIGURE 4 is a cross-sectional view similar to FIGURE 3, illustrating the boomer in the closed position holding the bracket on the bumper; and FIGURE 5 is a cross-sectional view of the bumper bracket of FIGURE 2 taken substantially along line 5—5 thereof as indicated in the direction of the arrows.

Referring now to the drawings in detail, wherein like reference characters designate like elements throughout the several views thereof, there is shown generally at 10 a vehicle illustrated as a truck having a bumper 12 to which is secured a pair of spaced apart brackets shown generally at 14 carrying a pair of flags shown generally at 16 and a sign 18.

Bracket 14 includes a first hook 20 formed of a strip of metal having a reverted end receiving the lower edge of bumper 12. An eye 22 is affixed to the upper surface of hook 20 and provides a means for connecting an elongate flexible member shown generally at 24 to hook 20. For several reasons of convenience, flexible member 24 is a chain comprised of a plurality of interlocked links 26 of a conventional type. As will be explained more fully hereinafter, an individual will tighten chain 24 to affix bracket 14 to bumper 12 when the remaining components of the instant invention are in place.

A second bumper engaging element shown generally at 28 comprises a second hook 30 made of a strip of relatively rigid material receiving the upper end of bumper 12 as shown best in FIGURES 3 and 4. Bumper engaging element 28 also includes an arcuate plate 32 residing adjacent the upper portion of bumper 12 as may be seen by a comparison of FIGURE 2 with FIGURES 3 and 4. Mounted on plate 32 and extending in the general direction of travel of vehicle 10 is a support 34 illustrated as a planar triangular piece of metal, but which may be of any suitable shape.

Mounted on the outermost end of support 34 is a boomer shown generally at 36 interconnecting support 34 and chain 24 for affixing bracket 14 to bumper 12. Boomer 36 includes a first U-shaped lever 38 pivotally mounted on the extremity of support 34 by a pivot pin 40. As may be seen best in FIGURE 3, pivot pin 40 is located intermediate the ends of first lever 38 and is preferably located closer to the upper end thereof. First lever 38 forms an outwardly extending ledge 42 such that an individual may place his foot thereon and forcibly pivot lever 38 about the axis of pivot pin 40 to tighten chain 24.

Boomer 36 also includes a second U-shaped lever 44 pivotally mounted adjacent the upper end of first lever 38 by a pivot bolt 46 as may be seen best in FIGURE 2. The lower end of second lever 44 forms a substantially horizontal plate 48 having a slot 50 therein constituting means for releasably receiving a selected length of chain 24.

When it is desired to secure bracket 14 to bumper 12, the individual will place second hook 30 over the upper edge of bumper 12, place first hook 20 under the lower edge of bumper 12, move first lever 38 to the position shown in FIGURE 3, position a selected link 26 of chain 24 in slot 50 of second lever 44 and then forcibly depress first lever 38 to the position shown in FIGURE 4. The rotation of first lever 38 about pivot axis 40 will act to raise pivot bolt 46 thereby increasing the distance between eye 22 and pivot bolt 46 to tighten chain 24.

Positioning flag 16 on bracket 14 is a holding means shown generally at 52 comprised of a substantially tubular holder 54 receiving a staff 56 of flag 16. A thumbscrew 58 extends through an internally threaded protuberance 60 to the interior of holder 54 for firmly securing staff 56 therein.

Mounting holder 54 on plate 52 is an upstanding brace 62 vertically affixed to plate 32 as may be seen best in FIGURES 3 to 5 inclusive. Referring now to FIGURE 5, the lower end of holder 54 is bifurcated and extends over the upper end of brace 62 with a conventional releasable fastening means 64, such as a nut and bolt or the like, acting to secure holder 54 in a suitable position with respect to brace 62. It should be apparent that any convenient type of conventional fastener may be provided between holder 54 and brace 62 in order to position holder 54 at a suitable angle. It should also be noted that the inner surface of brace 62 is welded or otherwise firmly affixed to support 34 and does not interfere with the movement of levers 38, 44 as may be seen best in FIGURE 5.

Sign 18 is supported between brackets 14 and is held by a pair of right angle members shown generally at 66. Angle members 66 are welded or otherwise secured to arcuate plate 32 in a vertical position. Each of right angle members 66 includes a front plate 68, a parallel back plate (not seen in FIGURE 2) and a thumbscrew 70 for securing sign 18 between the front and back plates of right angle members 66.

An important feature of the instant invention resides in the U-shaped nature of levers 38, 44 which provides a balanced and compact structure for rapidly and expeditiously securing brackets 14 to bumper 12.

It is now seen that there is herein provided an improved bumper bracket which accomplishes all of the objects and advantages of the instant invention as well as many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. A bracket for rapid attachment to a vehicle bumper for carrying an upstanding article thereon comprising:
    a first hook for receiving the lower edge of the bumper;
    an elongate flexible member secured to the first hook for placement adjacent the outer surface of the bumper;
    a second hook for receiving the upper edge of the bumper;
    a support affixed to the second hook for residing against the upper section of the bumper; and
    means interconnecting the flexible member and the support, for tightening the flexible element and securing the hooks to the bumper, said interconnecting means including,
    a first lever pivotally mounted on the support having a handle for forcibly pivoting the first lever, and
    a second lever, pivotally mounted on the first lever, having means receiving the free end of the flexible member; and
    means on the bracket for holding the upstanding article.
2. The bracket of claim 1 wherein
    the first lever is pivoted on the support intermediate the ends thereof; and
    the second lever is pivoted on the first lever at a point above the connection of the first lever and the support.
3. The bracket of claim 1 wherein
    the support includes a substantially vertical plate;
    the first lever includes a U-shaped structure straddling the support; and
    the second lever includes a U-shaped structure straddling the support, the first and second levers nesting together when the bracket is affixed to the bumper.
4. The bracket of claim 1 wherein
    the first hook is made of a first strap of material having a reverted end;
    the second hook is made of a second strap of material having a reverted end and a smoothly arcuate plate for residing against the upper section of the bumper, the plate acting as a base for the support.
5. The bracket of claim 3 wherein the holding means is affixed to the plate and comprises an elongate hollow holder for receiving the staff of a flag.
6. The bracket of claim 4 wherein the holding means further includes a right angled segment having means for receiving the edge of a rectangular sign.

References Cited
UNITED STATES PATENTS

| | | | |
|---|---|---|---|
| 1,819,768 | 8/1931 | Coffing | 248—43 |
| 3,013,754 | 12/1961 | Hastings | 248—43 |
| 3,100,241 | 8/1963 | Goldstein | 248—43 XR |

JOHN PETO, *Primary Examiner.*